United States Patent
Fujiwara et al.

(10) Patent No.: US 7,019,765 B2
(45) Date of Patent: Mar. 28, 2006

(54) INPUT DEVICE

(75) Inventors: Toshimitsu Fujiwara, Kyoto (JP);
Masahiro Kinoshita, Kyoto (JP);
Yasunari Kitajima, Kyoto (JP);
Hiroyuki Iwasaka, Kyoto (JP);
Yoshihiro Tanabe, Kyoto (JP); Hideshi Tsugui, Kyoto (JP)

(73) Assignee: OMRON Corporation, Kyoto (JP)

( * ) Notice: Subject to any disclaimer, the term of this patent is extended or adjusted under 35 U.S.C. 154(b) by 266 days.

(21) Appl. No.: 10/300,708

(22) Filed: Nov. 20, 2002

(65) Prior Publication Data

US 2003/0102875 A1 Jun. 5, 2003

(30) Foreign Application Priority Data

Nov. 22, 2001 (JP) ............................ 2001-357938
Jun. 10, 2002 (JP) ............................ 2002-168676

(51) Int. Cl.
*G09G 5/00* (2006.01)

(52) U.S. Cl. .............................. 347/173; 345/4; 345/5; 345/113; 345/204; 345/205; 345/905; 178/18.01; 178/18.06; 341/33; 361/681

(58) Field of Classification Search ................ 345/173, 345/4, 5, 113, 204, 205, 905; 178/18.01, 178/18.06; 341/33; 361/681
See application file for complete search history.

(56) References Cited

U.S. PATENT DOCUMENTS

| | | | | | |
|---|---|---|---|---|---|
| 4,437,055 | A | * | 3/1984 | Meyer | .......................... 324/725 |
| 5,237,284 | A | * | 8/1993 | Van Der Valk | ............. 324/662 |
| 5,290,728 | A | * | 3/1994 | Sato | ........................... 438/301 |
| 5,992,240 | A | * | 11/1999 | Tsuruoka et al. | .............. 73/718 |
| 6,002,139 | A | * | 12/1999 | Katagiri | ...................... 250/556 |
| 6,002,389 | A | * | 12/1999 | Kasser | ....................... 345/173 |
| 6,265,986 | B1 | * | 7/2001 | Oka et al. | .............. 340/815.52 |
| 6,279,810 | B1 | * | 8/2001 | Chan-Wong et al. | ........ 228/1.1 |
| 6,326,564 | B1 | * | 12/2001 | Komatsu et al. | ......... 178/18.01 |
| 6,542,717 | B1 | * | 4/2003 | Zimmerman et al. | ....... 455/100 |

* cited by examiner

*Primary Examiner*—Ricardo Osorio
*Assistant Examiner*—Vincent E. Kovalick
(74) *Attorney, Agent, or Firm*—Osha•Liang LLP

(57) ABSTRACT

An input device, which is small-sized and inexpensive in spite of being simple in construction and thin, comprises at least one primary electrode and a plurality of secondary electrodes, both electrodes being formed in the same plane. A position of a dielectric is identified on the basis of differences in electrostatic capacity between the primary electrode and the secondary electrodes, which electrostatic capacity is changed by the dielectric positioned on a surface side of the both electrodes.

8 Claims, 16 Drawing Sheets

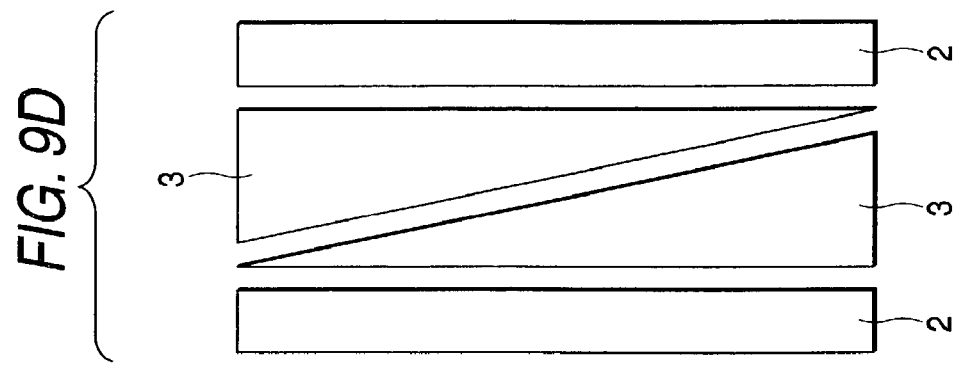
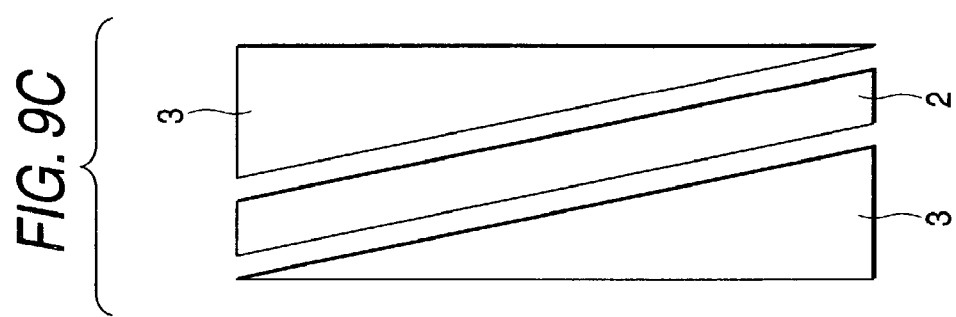
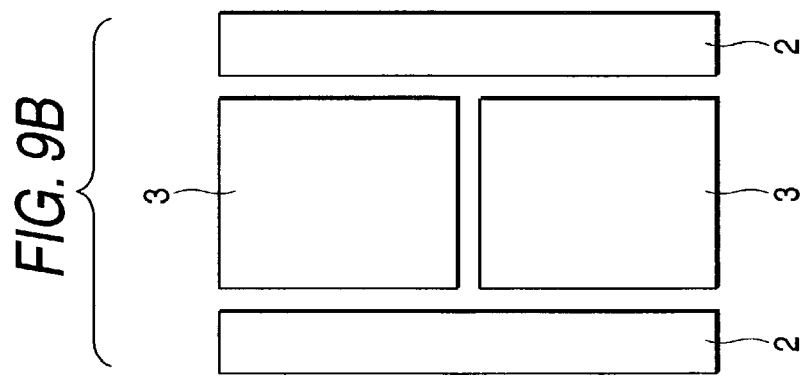
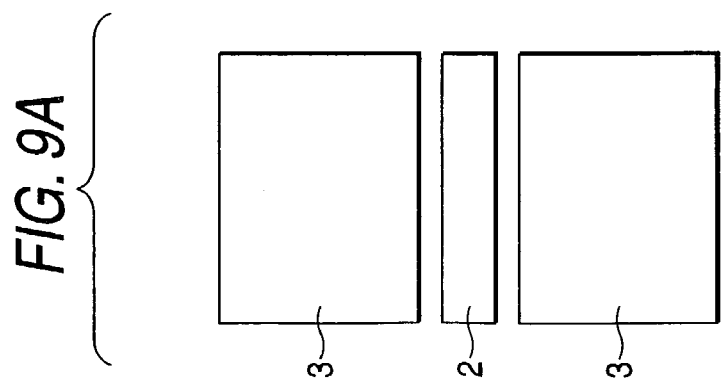

FIG. 17D
FIG. 17C
FIG. 17F
FIG. 17B
FIG. 17E
FIG. 17A
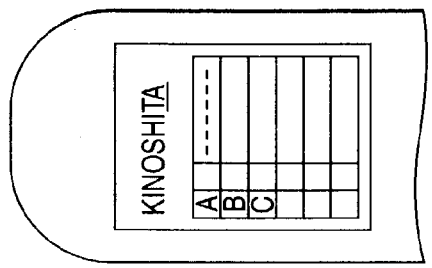
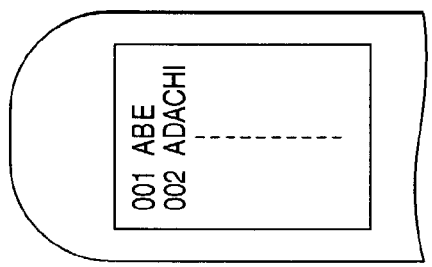
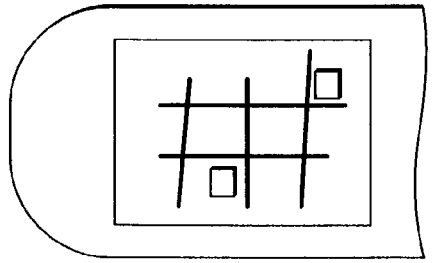
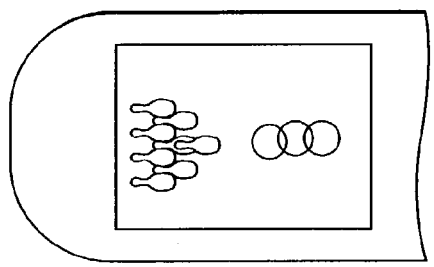
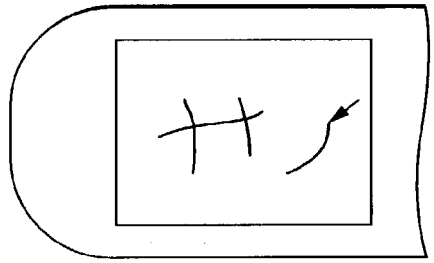
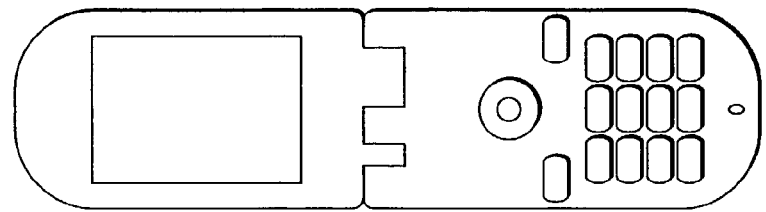

INPUT DEVICE

BACKGROUND OF THE INVENTION

The present invention relates to an input device of electrostatic capacity type, which is usable as pointing device or the like.

Conventionally, for example, the following configuration is well known as an input device of electrostatic capacity type.

Japanese Patent Laid-Open No. 357050/2000 discloses a configuration, in which a twist deformation section is operated to incline a movable electrode, thereby detecting changes in electrostatic capacity between the electrode and a plurality of opposed electrodes.

Japanese Patent Laid-Open No. 5481/1996 discloses a configuration, in which a moving electrode is moved above a transmitting electrode arranged centrally of a substrate and receiving electrodes arranged around the transmitting electrode in X and Y directions, whereby changes in areas facing the respective electrodes are detected as electrostatic capacities to measure magnitude and direction of an external force from outside.

With the above conventional input device, however, the electrodes must be opposed to each other vertically, which leads to an increase in thicknesswise dimension and a need of mechanical parts such as a twist deformation section and a moving electrode. Therefore, the number of parts is increased to involve complexity in configuration, workability in assembling is worsened, failure is easily caused, and cost becomes high.

SUMMARY OF THE INVENTION

Hereupon, the inventors of the present application have thought of the invention taking notice of the fact that even in the case where a pair of electrodes are arranged in the same plane, electrostatic capacity between the both electrodes changes when an electric conductor is disposed on surfaces of the electrodes.

That is, the invention has its object to provide an input device, which is small-sized and can be manufactured inexpensively in spite of being simple in construction and thin.

The invention provides measures for solving the above problem, comprising at least one primary electrode and a plurality of secondary electrodes, the both electrodes being formed in the same plane, and wherein a position of an electric conductor disposed on a surface side of the both electrodes is identified on the basis of differences in electrostatic capacity between the primary electrode and the secondary electrodes, which electrostatic capacity is changed by the electric conductor.

With this configuration, when the electric conductor is moved on the surface side of the both electrodes, a moving speed and moving position of the electric conductor can be detected on the basis of changes in electrostatic capacity between the primary electrode and the secondary electrodes because the positional relationship between the primary electrode and the secondary electrodes is specified. Since a position of the electric conductor is specified on the basis of changes in electrostatic capacity between the primary electrode and the respective secondary electrodes, accuracy of detection can be enhanced as compared with the case where electrostatic capacity between a plurality of electrodes is simply detected.

Formation of a first insulating layer on surfaces of the both electrodes to constitute an operating surface is preferable in that it is possible to improve operability while preventing contamination of electrodes.

Formation of a grounding layer on a back surface side of the both electrodes with a second insulating layer therebetween is preferable in that it is possible to correctly grasp changes in electrostatic capacity on the operating surface side.

The sum of electrostatic capacities between the primary electrodes and the secondary electrodes may be calculated to detect presence and absence of the electric conductor on the basis of changes in the sum of electrostatic capacities.

Formation of the second insulating layer from a material, which is varied in dielectric constant upon pressure sensing, is preferable in that it is possible to detect a state of depression by the electric conductor.

Formation of the first insulating layer from a light transmission material is preferable in that it is possible to make positions of the electrodes visual from the operating surface side.

Formation of the whole device in a dome-shape is preferable in that discrimination of direction and position of operation from the central portion is made easy.

Provision of the circuit substrate integrally on the back surface side of the both electrodes is preferable in that it is possible to make the device compact in construction.

Formation of the first and second electrodes, respectively, in a dendritic shape to arrange the electrodes in an indent manner relative to each other is preferable in that it is possible to enhance accuracy in detecting presence and absence of the electric conductor.

When the first electrode is formed to be annular-shaped and the second electrodes are formed along the first electrode, it is also possible to detect a position of movement when the electric conductor is rotated along the electrodes.

When the input device comprises a detecting section provided with the both electrodes and for detecting a position of a dielectric disposed on a surface thereof on the basis of changes in electrostatic capacity between the both electrodes, amounting section provided with means for detecting a depressing operation on the detecting section, and a base section supporting the detecting section and the mounting section in a manner to enable depressing the sections, the base section being provided with electrode terminals capable of elastically deforming so as to come into pressure contact with the respective electrodes of the detecting section, the input device is preferable in that it is compact in configuration and can be worked with high accuracy.

The detecting section preferably comprises arithmetic means for calculating a position of the dielectric on the basis of changes in electrostatic capacity between the electrodes, and an external terminal for outputting results of calculation in the arithmetic means.

BRIEF DESCRIPTION OF THE DRAWINGS

FIGS. 9A to 9D are plan views showing still further examples of an arrangement of a primary electrode and secondary electrodes in the input device;

FIGS. 17A to 17F are plan views showing examples, in which the input device shown in FIG. 11 is adopted in portable telephones;

DETAILED DESCRIPTION OF PREFERRED EMBODIMENTS

Embodiments of the invention will be described below with reference to the accompanying drawings.

Figure 1:
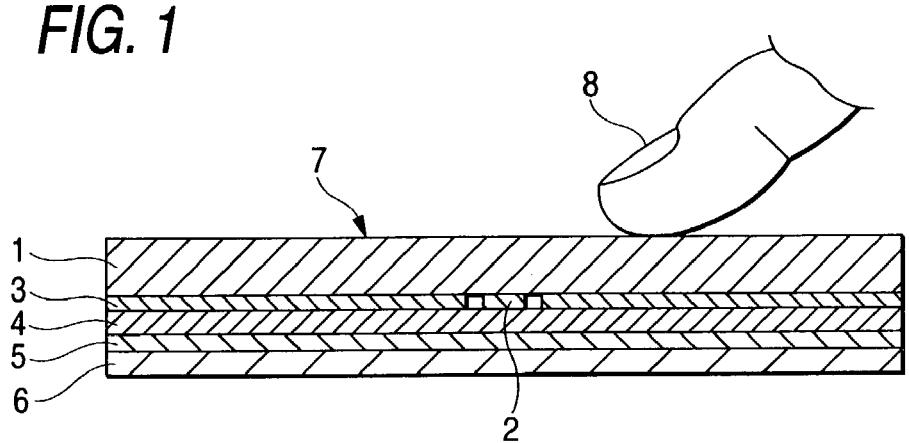
FIG. 1 is a cross sectional view showing an input device according to an embodiment.
Figure 2:
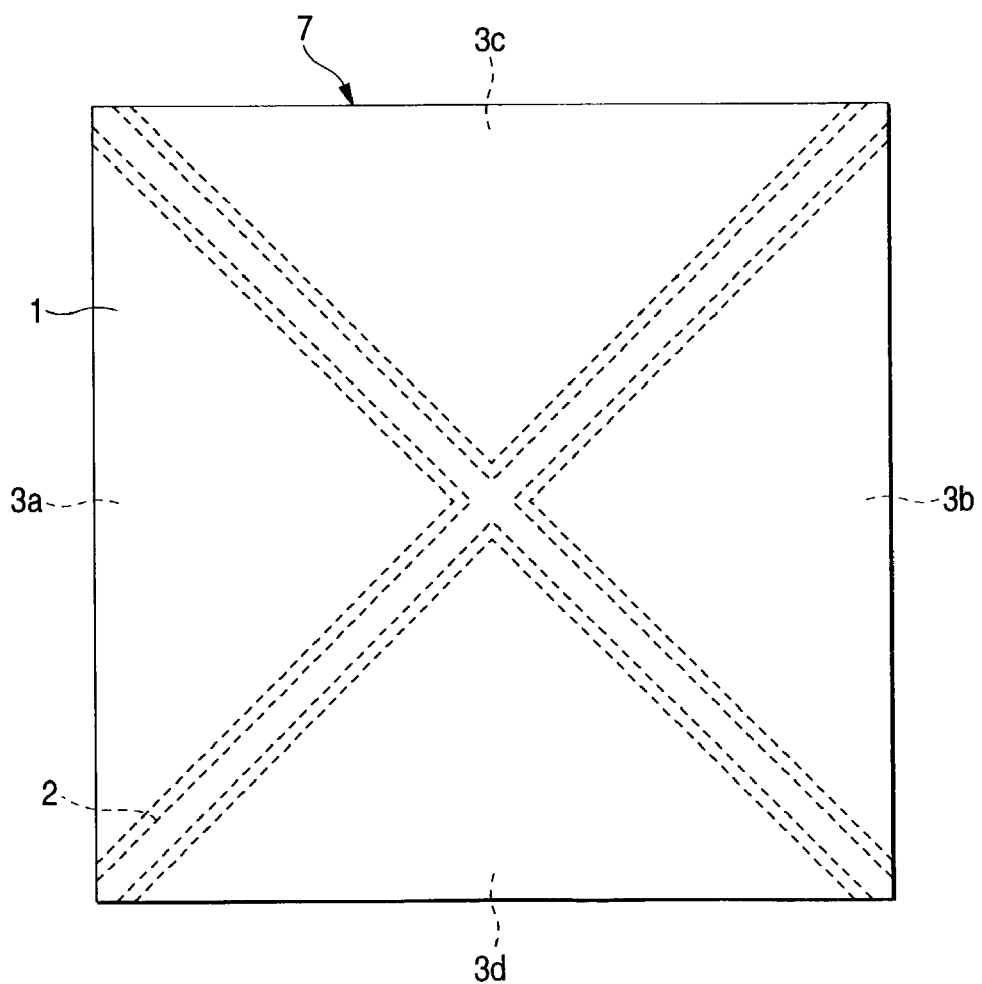
FIG. 2 is a plan view showing the input device according to the embodiment.
Figure 3:
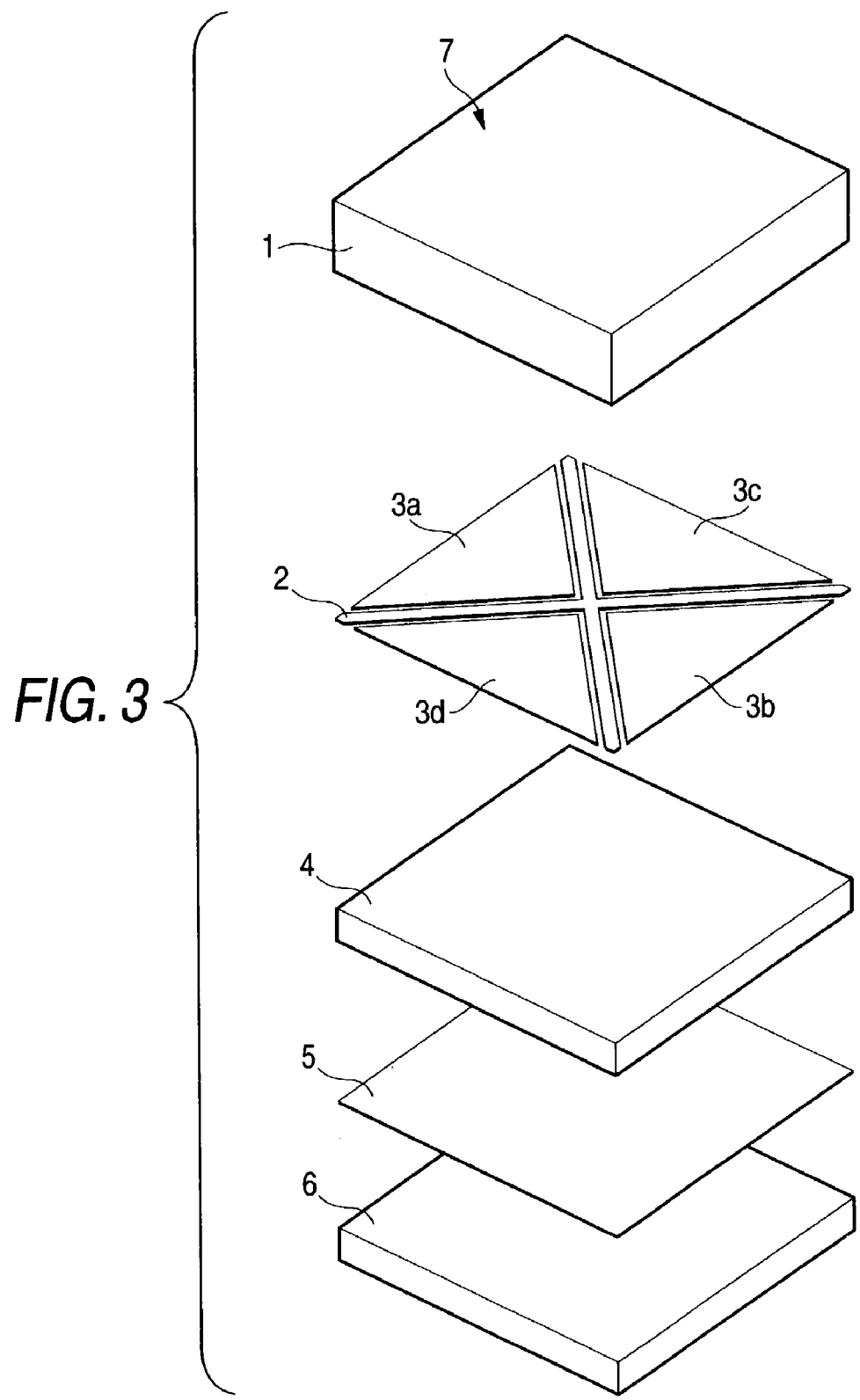
FIG. 3 is an exploded, perspective view showing the input device according to the embodiment.

FIGS. 1 to 3 show an input device according to a first embodiment. The input device is in the form of a rectangular thin sheet as viewed in plan view, and comprises a first insulating layer 1, primary electrode 2, secondary electrodes 3 (3a, 3b, 3c, 3d), second insulating layer 4, grounding layer 5, and a third insulating layer 6 in order from a side of an operating surface 7.

The first insulating layer 1 is formed from an insulating material such as polyethylene terephthalate (PET), polyimide or the like to have a thickness of about 0.1 mm and a square shape having sides of 20 mm, and the surface of the layer defines the operating surface 7.

The primary electrode 2 and the secondary electrodes 3 are formed from a conductive material such as copper or the like to be disposed on the same surface and have a thickness of about 10 μm. As shown in FIG. 2, the primary electrode 2 extends diagonally in a cross manner, and the secondary electrodes 3 are triangular-shaped to be arranged between portions of the primary electrode 2 with a predetermined gap. Voltage from a power source (not shown) is supplied between the both electrodes 2, 3.

The second insulating layer 4 and the third insulating layer 6 are formed from the same material as that of the first insulating layer 1 to have a thickness of 20 to 30 μm.

The grounding layer 5 is formed from a conductive material such as copper or the like to have a thickness of about 10 μm and provided for appropriately detecting changes in electrostatic capacity between the primary electrode 2 and the secondary electrodes 3, caused due to positioning of an electric conductor 8 (here, a finger) on the operating surface 7 of the first insulating layer 1.

Figure 4:
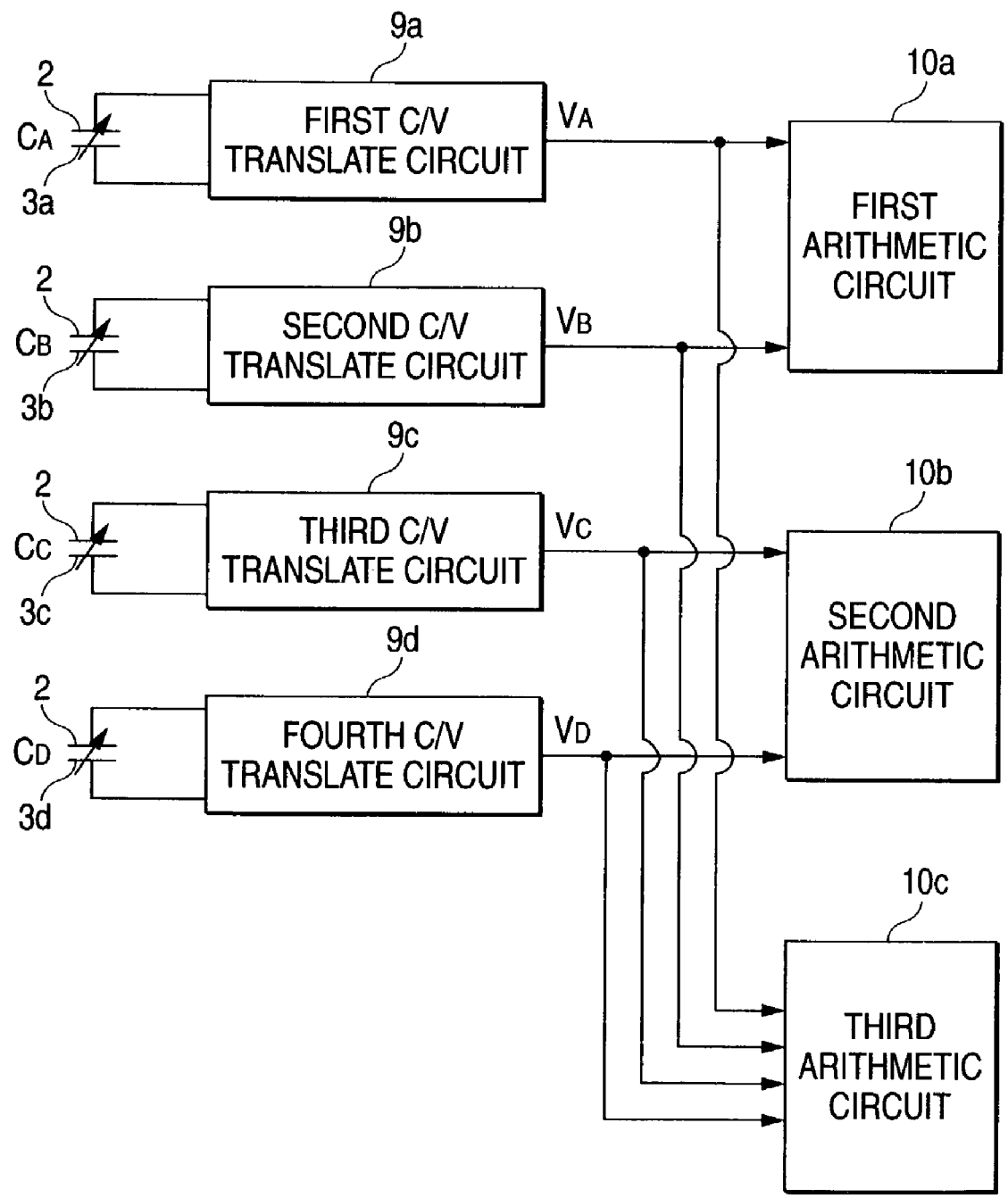
FIG. 4 is a block diagram showing an example of a circuit configuration when the input device shown in FIG. 1 is used.

The input device structured in the above manner can be simply finished by using printing, sputtering or the like to sequentially form the primary electrode 2, the secondary electrodes 3, the second insulating layer 4, the grounding layer 5, and the third insulating layer 6 on a back surface of the first insulating layer 1 and connecting the primary electrode 2, the secondary electrodes 3, and the grounding layer 5 to electronic circuits shown in FIG. 4. In the finished input device, the respective very thin layers are laminated by means of existing methods. Therefore, in spite of being thin, the input device can be manufactured in a small size and at low cost. Also, the primary electrode 2 and the secondary electrodes 3 act as a capacitor, in which an upper region (including the first insulating layer 1) therebetween constitutes a dielectric. Therefore, when a dielectric 8 is positioned on the operating surface 7, electrostatic capacity between the primary electrode 2 and the respective secondary electrodes 3 is varied, so that a position of the dielectric 8 can be specified as described later on the basis of such change.

The input device structured in the above manner can be incorporated into, for example, a circuit configuration shown in FIG. 4 to be used in pointing devices, portable telephones, information terminals (PDA) or the like.

In FIG. 4, electrostatic capacities between the primary electrodes 2 and the secondary electrodes 3a, 3b, 3c, 3d are taken into arithmetic circuits 10a, 10b, 10c via C/V translate circuits 140 (electrostatic capacity/voltage translate circuits) 9a, 9b, 9c, 9d. Whether the dielectric 8, for example, a finger, is positioned on the operating surface 7 is detected on the basis of changes in the sum (or an average value) of electrostatic capacities between the primary electrodes 2 and the respective secondary electrodes 3a, 3b, 3c, 3d. Actually, electrostatic capacities are converted into voltage values $V_A$, $V_B$, $V_C$, $V_D$ by the C/V translate circuits 1409a, 1409b, 1409c, 1409d, and the third arithmetic circuit 10c sums up the voltage values $V_A$, $V_B$, $V_C$, $V_D$. When the resulting value is greater than a reference value, it is judged that a finger is positioned on the operating surface 7 and when the resulting value is less than the reference value, it is judged that no finger is positioned on the operating surface.

Also, electrostatic capacities between the primary electrodes 2 and the secondary electrodes 3a, 3b, 3c, 3d differ depending upon a position of a finger on the operating surface 7. More specifically, electrostatic capacities $C_A$ and $C_B$ between the primary electrodes 2 and the secondary electrodes 3a, 3b are different in value depending upon whether a finger is positioned on right or left (X direction) side of a center of the operating surface 7 in FIG. 2. Also, electrostatic capacities $C_C$ and $C_D$ between the primary electrodes 2 and the secondary electrodes 3c, 3d are different in value depending upon whether a finger is positioned on upper or lower (Y direction) side of the center of the operating surface 7 in FIG. 2. Hereupon, the arithmetic circuit 10a determines a position of the dielectric 8 in the X direction on the basis of a difference between the voltage values $V_A$, $V_B$ converted by the C/V translate circuits 1409a, 1409b. When the voltage value $V_A$ is greater than $V_B$, it is judged that the dielectric 8 is positioned on the right side, and when the voltage value $V_B$ is greater than $V_A$, it is judged that the dielectric is positioned on the left side, in what position on the right side the dielectric is located being specified on the basis of a magnitude of the difference. Also, the arithmetic circuit 10*b* determines a position of the dielectric 8 in the Y direction on the basis of a difference between the voltage values $V_C$, $V_D$ converted by the C/V translate circuits 1409*c*, 1409*d*. When the voltage value $V_C$ is greater than $V_D$, it is judged that the dielectric 8 is positioned on the right side, and when the voltage value $V_D$ is greater than $V_C$, it is judged that the dielectric is positioned on the left side, in what position on the left side the dielectric is located being specified on the basis of a magnitude of the difference. Also, since electrostatic capacities between the primary electrodes 2 and the respective secondary electrodes 3*a*, 3*b*, 3*c*, 3*d* are varied due to movements of the dielectric 8, it is possible to specify moving speeds of the dielectric 8 on the basis of rates of change in the electrostatic capacities.

In addition, while the electrodes 2, 3 are arranged as shown in FIGS. 2 and 3 in the above embodiment, they may be arranged as shown in FIGS. 5 to 9.

Figure 5:
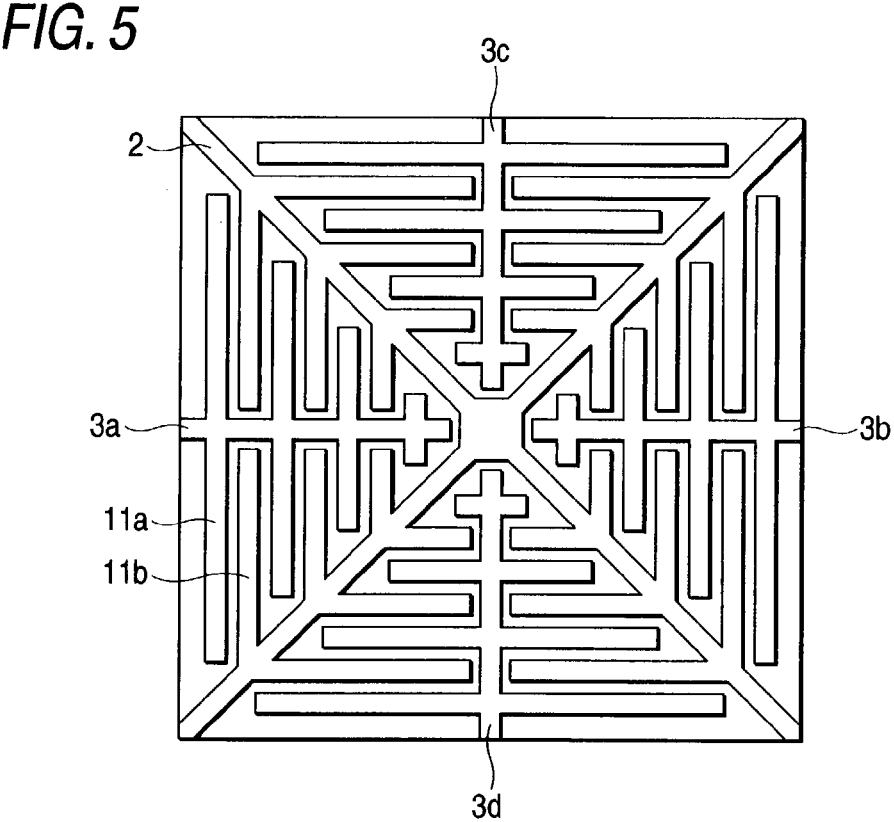
FIG. 5 is a plan view showing an example of an arrangement of a primary electrode and secondary electrodes in the input device.

In FIG. 5, first and second dendritic (here, comb-shaped) extensions 11*a*, 11*b*, respectively, are formed on primary electrodes 2 and secondary electrodes 3*a*, 3*b*, 3*c*, 3*d* to get in the respective regions to be disposed adjacent to one another in a manner not to interfere with one another. With such arrangement, even when the dielectric 8 is positioned anywhere on the operating surface 7, the primary electrodes 2 will be necessarily disposed on portions opposed to the dielectric 8. Accordingly, it is possible to correctly detect the total amount of electrostatic capacities between the primary electrodes 2 and the respective secondary electrodes 3*a*, 3*b*, 3*c*, 3*d*, that is, to appropriately judge whether the dielectric 8 is disposed on the operating surface 7.

Figure 6:
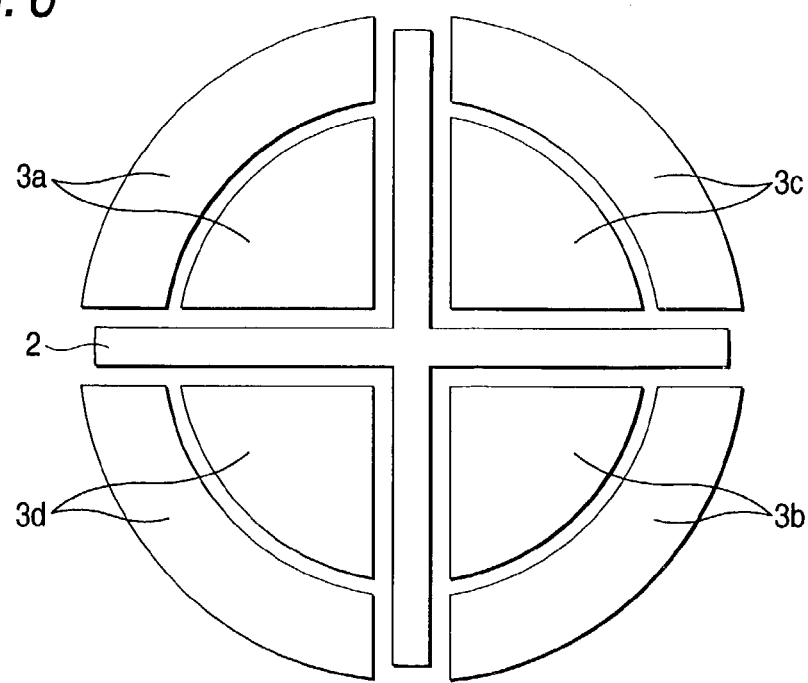
FIG. 6 is a plan view showing a further example of an arrangement of a primary electrode and secondary electrodes in the input device.

In FIG. 6, secondary electrodes 3 (3*a*, 3*b*, 3*c*, 3*d*), respectively, are radially divided into two sections about a center of a primary electrode 2. Thereby, it is possible to accurately detect a position of the dielectric 8 over an extensive region on an outer peripheral side distant from the center of the primary electrode 2. Also, that number, into which the secondary electrodes 3 are radially divided, is not limited to two but can be three or more.

Figure 7:
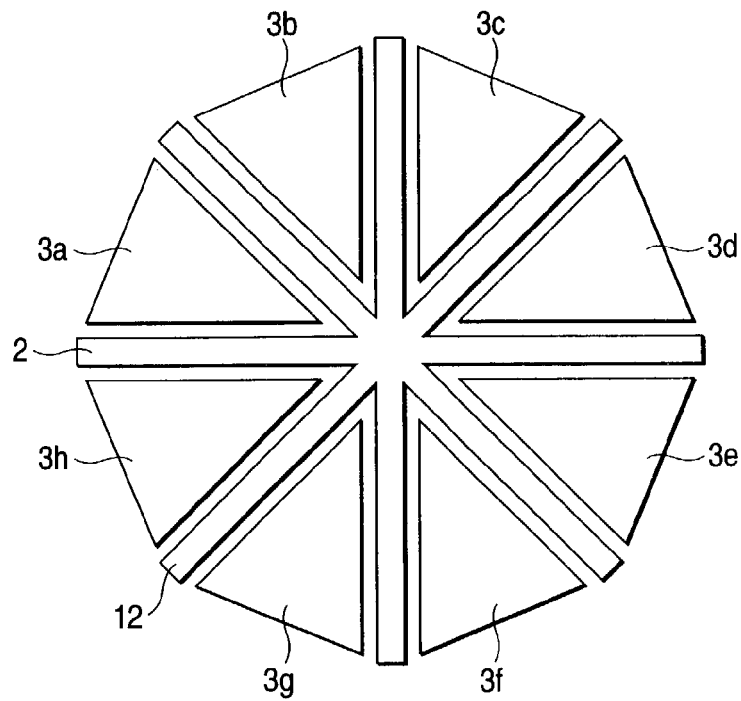
FIG. 7 is a plan view showing a still further example of an arrangement of a primary electrode and secondary electrodes in the input device.

In FIG. 7, a primary electrode 2 extends in eight directions from a center thereof, and secondary electrodes 3 (3*a* to 3*h*), respectively, are arranged between the respective extensions 12. That is, the secondary electrodes 3 are divided into eight sections to be arranged. Thereby, comparing with judgment in two directions (X direction and Y direction) as in the above embodiment, it is possible to more correctly detect in which direction about the center of the primary electrode 2 the dielectric 8 is positioned.

Figure 8:
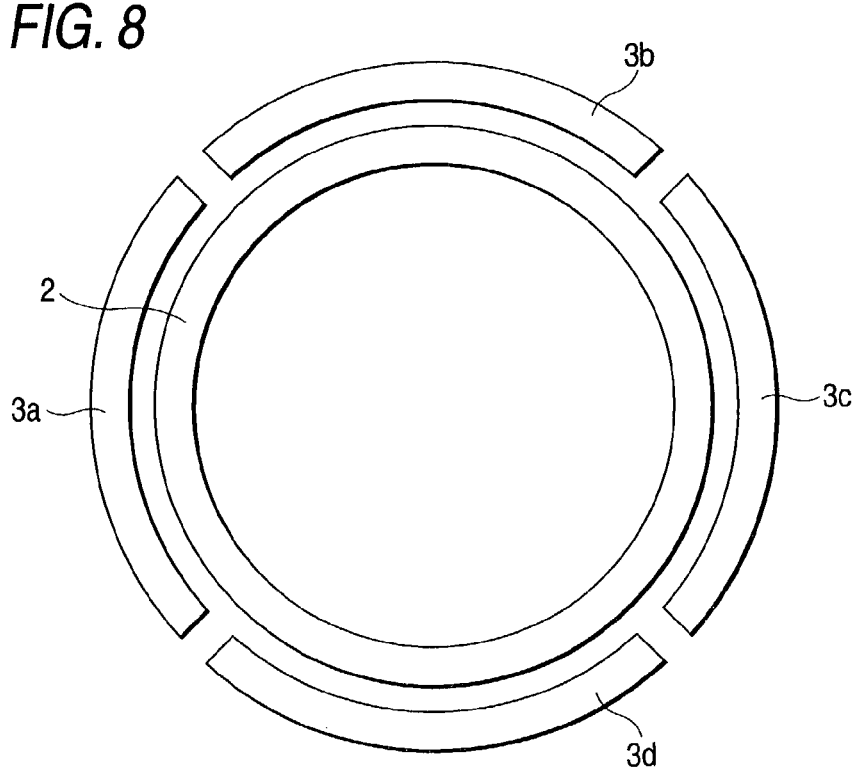
FIG. 8 is a plan view showing a further example of an arrangement of a primary electrode and secondary electrodes in the input device.

In FIG. 8, a primary electrode 2 is formed to be annular in shape, and secondary electrodes 3 (3*a* to 3*d*) are formed in four locations equally spaced along an outer peripheral edge of the primary electrode. With such arrangement, when the dielectric 8 is rotatingly moved along the both electrodes 2, 3, direction and position of rotation can be detected, so that the arrangement can be adopted in, for example, a remote control for VTR, to be able to exhibit fast-forward and rewinding functions.

FIGS. 9A to 9D show examples of that arrangement of electrodes 2, 3, which makes it possible to detect only movements of the dielectric 8 in the Y direction. In FIG. 9A, secondary electrodes 3 are arranged above and below a primary electrode 2. In FIG. 9B, primary electrodes 2 are arranged on both sides of secondary electrodes 3 arranged vertically. In FIG. 9C, a primary electrode 2 is arranged obliquely, and secondary electrodes 3 are formed along the primary electrode 2 to decrease in width dimension toward one ends thereof from the other ends thereof. In FIG. 9D, secondary electrodes 3 are formed with facing edges thereof oblique, and primary electrodes 2 are arranged on both sides of the secondary electrodes 3. With the exemplary arrangements, the dielectric 8 is slidingly moved either upward or downward whereby it is possible to exhibit a function as a mouse wheel (scroll function in a screen).

Also, while the grounding layer 5 in the above embodiments is provided in order to appropriately detect changes in electrostatic capacity between the primary electrode 2 and the secondary electrodes 3, presence and absence of depression on the operating surface 7 may be detected by forming the second insulating layer 4 from, for example, aluminum nitride (AlN) or the like, which is varied in dielectric constant upon pressure sensing. More specifically, detection of changes in electrostatic capacity between the electrodes 2, 3 and the grounding layer 5 makes it possible to detect whether the operating surface 7 is depressed, so that it becomes possible to add other functions, such as continuous scroll on a screen.

Also, while the first insulating layer 1, the electrodes 2, 3 or the like in the above embodiments are formed from opaque materials, at least the first insulating layer 1 may be formed from a light transmission material. In this case, the arrangement of the electrodes is made visible, and the input device can be used for various applications by making various indications on a visible region or forming a liquid crystal screen on the region.

Figure 10:
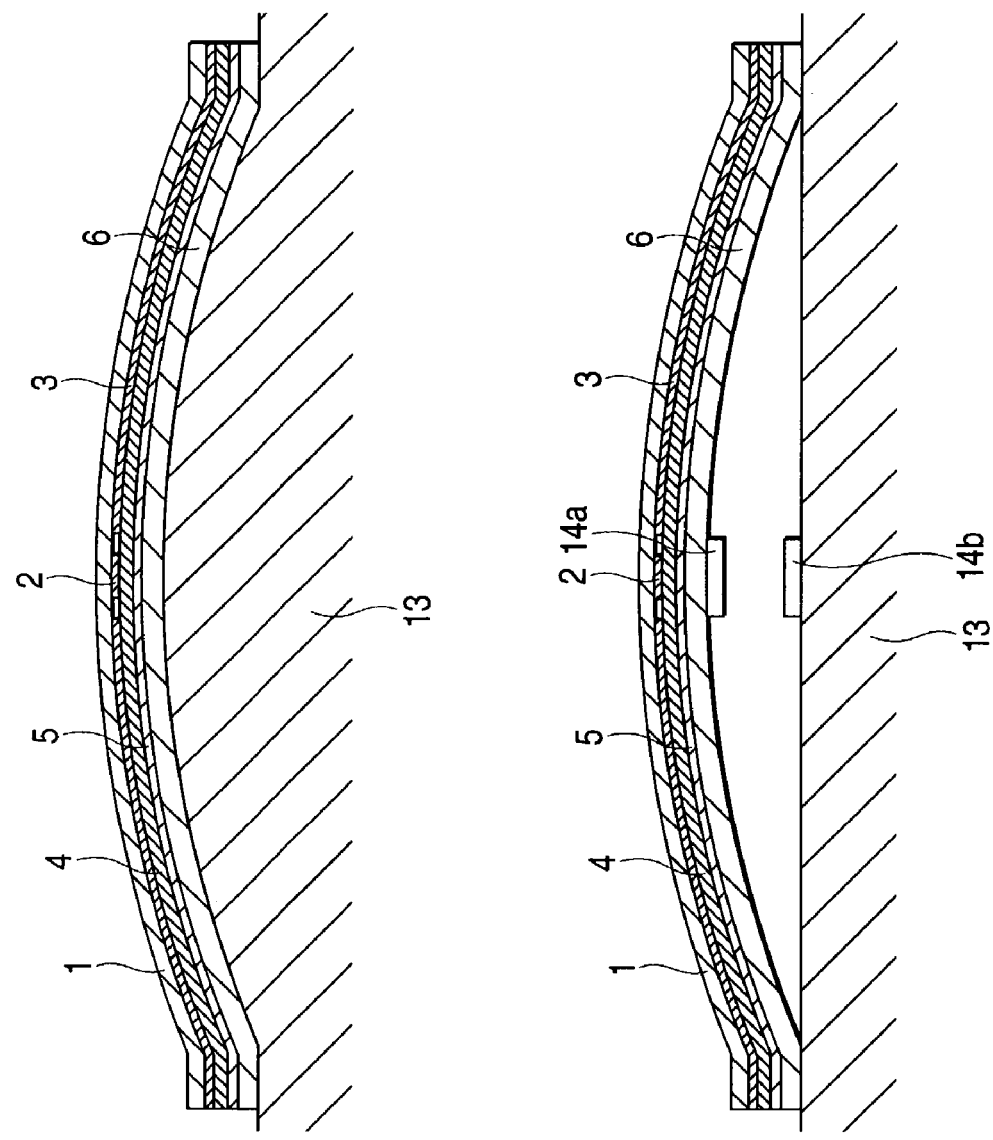
FIGS. 10A and 10B are cross sectional views showing input devices according to further embodiments.

Also, while the operating surface 7 is planar in the above embodiments, it may be formed to be dome-shaped as shown in FIGS. 10A and 10B. In this case, electrodes 2, 3 are sequentially formed on a first insulating layer 1 to be made planar, and then a dome-shaped configuration may be achieved by means of press working or the like. With such configuration, it is possible to sensibly recognize a central position of the operating surface 7 and a direction, in which the dielectric 8 is operated, thus making operability favorable. In addition, while a base 13 may be formed as shown in FIG. 10A to assume the same shape as that of a space formed on an underside of a third insulating layer 6 so as to prevent deformation of the input device, the base 13 may be made planar and a space may be formed so that the input device can be deformed. With such arrangement, contacts 14*a*, 14*b* (maybe layers like the electrodes 2, 3), respectively, may be formed on the third insulating layer 6 and the base 13 so that opening and closing of the contacts 14*a*, 14*b* leads to detection of whether the input device is depressed or not.

Also, while in the above embodiments electrostatic capacities between the primary electrodes 2 and the secondary electrodes 3 are converted into voltage values by means of the C/V translate circuits 1409*a* to 1409*d*, the electrostatic capacities can be converted into frequencies by means of C/F translate circuits (electrostatic capacity/frequency translate circuits) or into time delays by means of delay circuits. In particular, adoption of delay circuits provides an advantage that circuits can be simplified in configuration.

Also, while in the above embodiments electronic circuits are provided separately from the input device, a substrate formed with electronic circuits can be configured to be made integral in place of the third insulating layer 6. In this case, a compact configuration is made possible.

Figure 11:
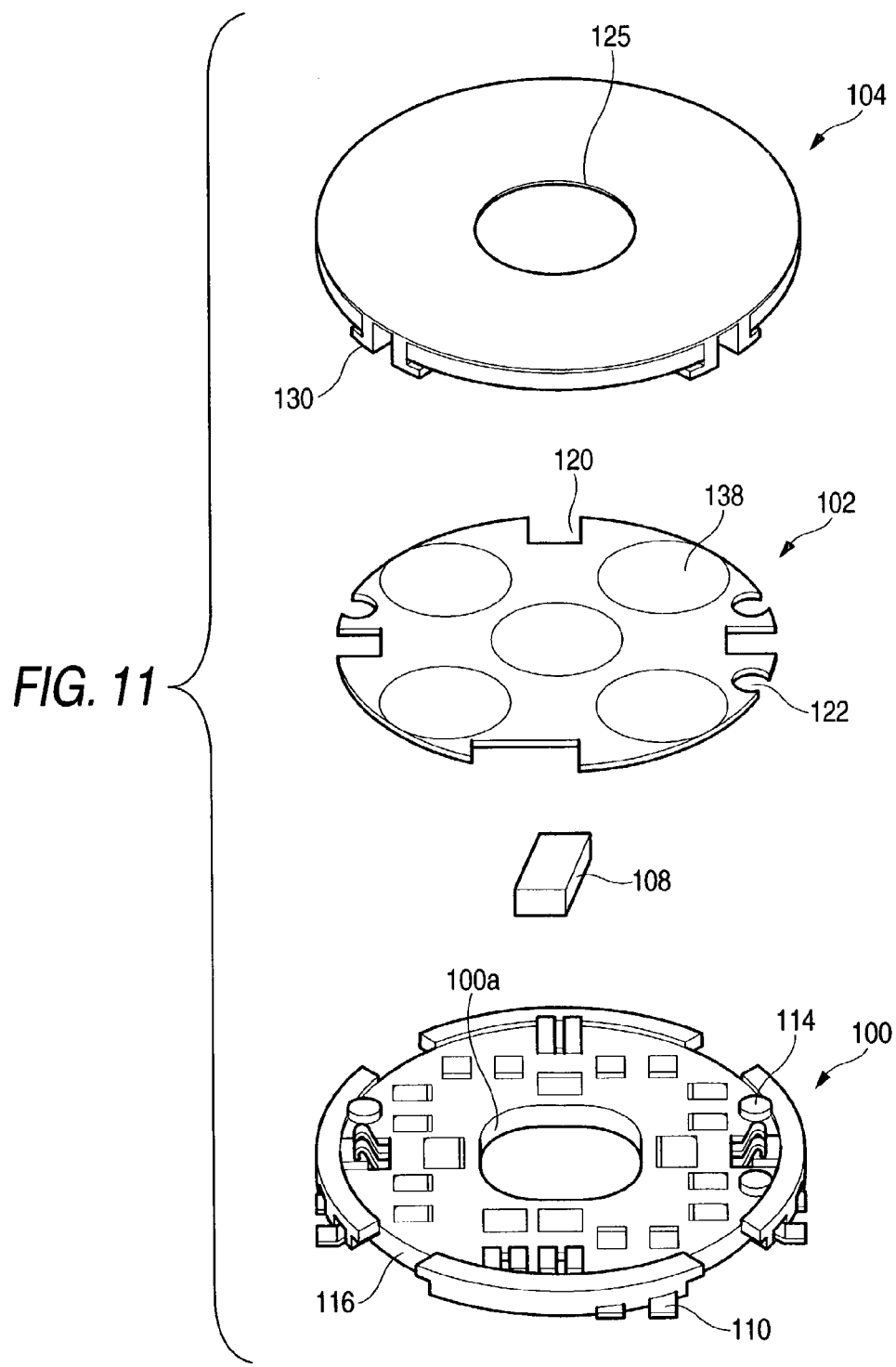
FIG. 11 is an exploded, perspective view showing an input device according to a still further embodiment.

FIG. 11 shows an input device according to a second embodiment. The input device is composed of a base section 100, a mounting section 102, and a detecting section 104.

Figure 12:
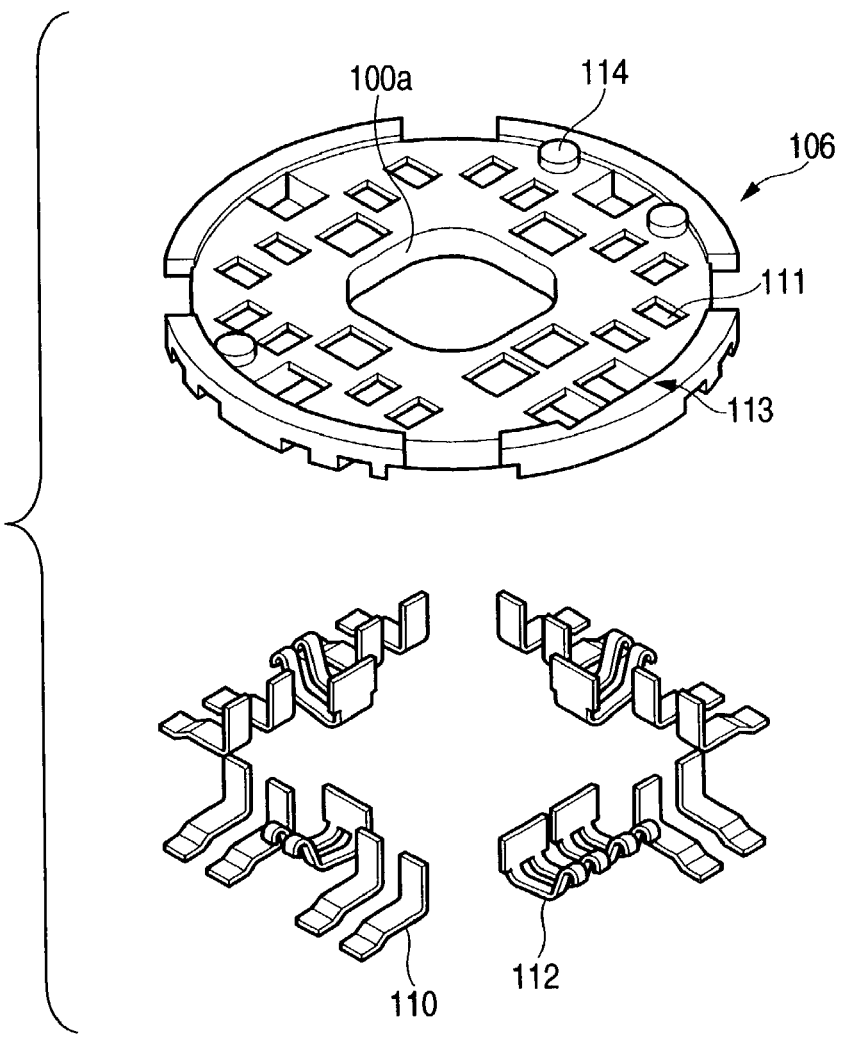
FIG. 12 is an exploded, perspective view showing a base section of the input device shown in FIG. 11.
Figure 13A:
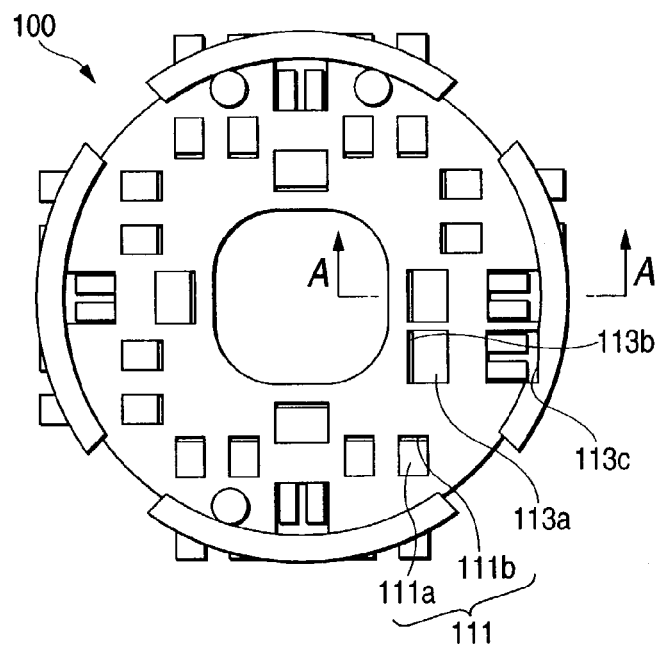
FIG. 13A is a plan view showing the base section of FIG. 12.
Figure 13B:
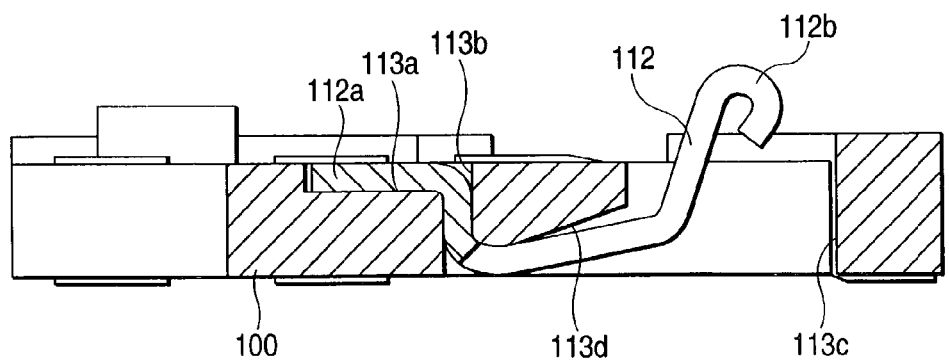
FIG. 13B is a cross sectional view taken along the line A—A in FIG. 13A.

As shown in FIGS. 12 and 13, the base section 100 is formed centrally thereof with a through hole 100a and in several locations around the through hole with a terminal holding portion 106. An IC chip 108 is arranged in the through hole 100a. The IC chip 108 detects a position of a finger on the detection surface as described later. The terminal holding portion 106 is composed of first terminal holding portions 111, in which external terminals 110 are arranged, and second terminal holding portions 113, in which electrode terminals 112 are arranged. The first terminal holding portions 111 comprise a rectangular-shaped recess 111a opened to an upper surface of the base section 100, and a rectangular-shaped hole 11b extending to a lower surface of the base section 100 from the rectangular-shaped recess 111a. The second terminal holding portions 113 comprise a recess 113a similar to the rectangular-shaped recess 111a, a rectangular-shaped hole 113b, a communication hole 113c communicated to the upper and lower surfaces, and a groove 113d formed on the lower surface and connected to the recess 113a and the rectangular-shaped hole 113b. The groove 113d is gradually inclined toward the upper surface side to be directed toward the rectangular-shaped hole 113b. The external terminals 110 comprise a contact portion 110a inserted into the rectangular-shaped hole 113b to be bent to be positioned in the recess 113a, and a terminal portion 110b extending radially outward from the lower surface of the base section 100. The electrode terminals 112 comprise a support portion 112a inserted into the rectangular-shaped hole 113b to be bent to be positioned in the recess 113a, and a pressure contact portion 112b extending in the groove 113d to branch off in two to extend through the communication hole 113c to project upward. Also, positioning projections 114, respectively, project from three locations on the upper surface of the base section 100 and an outer peripheral edge of the base section are cut out in four locations to form latch portions 116.

The mounting section 102 is adapted to mount thereon tactile switches 118 in a central location and four locations on an outer periphery of a disk-shaped substrate 117. Formed on an outer peripheral edge of the substrate 117 are first notches 120 for avoiding interference with the pressure contact portions of the electrode terminals 112, and second notches 122, with which the positioning projections 114 disposed in three positions engage for positioning relative to the base section 100 in a direction of rotation.

Figure 14:
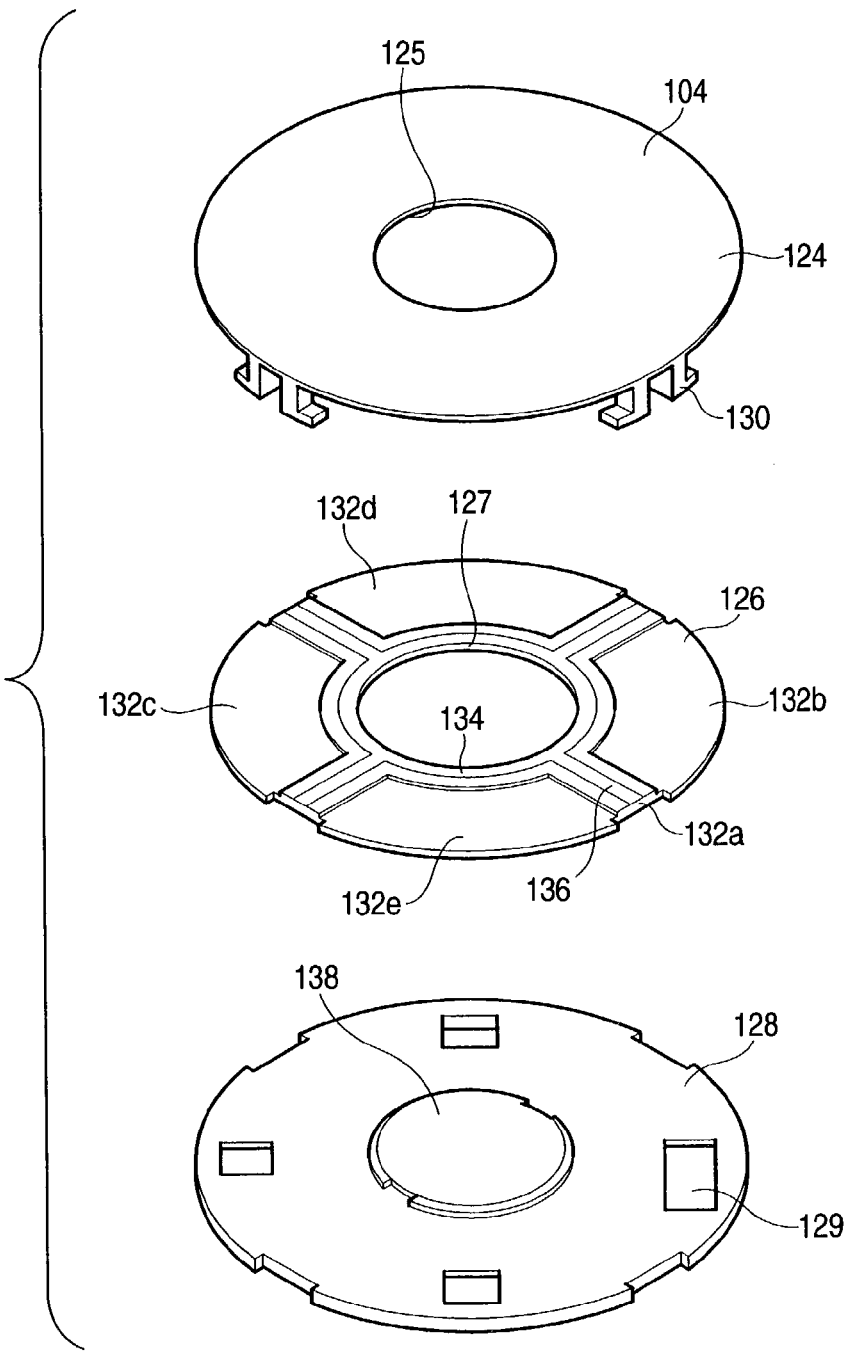
FIG. 14 is an exploded, perspective view showing a detecting section in FIG. 11.

The detecting section 104 comprises, as shown in FIG. 14, a detection layer 124, an electrode layer 126, and a support layer 128. The detection layer 124 is formed from an insulating material, formed with a central opening 125, and provided at an outer periphery thereof with latch projections 130. The latch projections 130 are latched on the respective latch portions 116 of the base section 100 whereby the detecting section 104 can be connected to and separated from the substrate 117. The electrode layer 126 comprises first to fifth electrodes 132a to 132e around a central opening 127. The first electrode 132a constitutes a primary electrode according to the invention, and comprises an annular portion 134 formed around a central opening 133, and straight portions 136 extending radially for four equally spaced locations on the annular portion 134. The second to fifth electrodes 132b to 132e constitutes a secondary electrode according to the invention, and are disposed in respective regions partitioned by the annular portion 134 and the straight portions 136. The support layer 128 is formed from a water-proof rubber sheet, and provided centrally thereof with a button plunger 138. The button plunger 138 is positioned in the both central openings 125, 127 to be exposed to a surface of the detection layer 124, and operatively depressed to drive the tactile switches 118 of the mounting section 102. Also, openings 129 are formed in four locations on an outer periphery of the support layer 128 to enable the pressure contact portions 112b of the respective electrode terminals 112 provided on the base section 100 to come into pressure contact with the second to fifth electrodes 132b to 132e.

Figure 15:
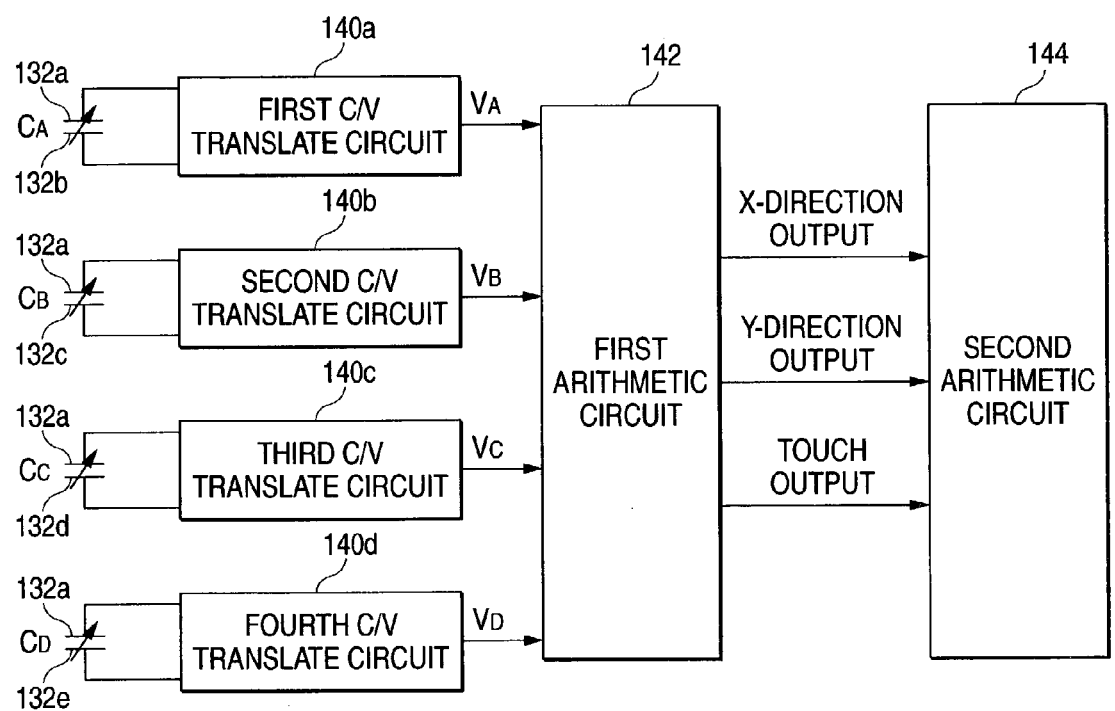
FIG. 15 is a block diagram showing an example of a circuit configuration when the input device shown in FIG. 11 is used.

The input device structured in the above manner can be used for various applications such as portable telephones or the like owing to, for example, a circuit configuration shown in FIG. 15.

In FIG. 15, respective electrostatic capacities between the first electrode 132a and the second to fifth electrodes 132b to 132e are input into a first arithmetic circuit 142 via first to fourth C/V translate circuits 140a to 140d. As in the first embodiment, the first arithmetic circuit 142 calculates in which of the X, Y, and Z directions a finger is positioned on a surface of the detecting section 104, on the basis of output voltages $V_A$ to $V_D$ from the first to fourth C/V translate circuits 140a to 140d. More specifically, a position in the X direction is detected on the basis of a difference ($V_{A-VB}$) between input voltages from the first and second C/V translate circuits 140a, 140b, a position in the Y direction is detected on the basis of a difference ($V_{C-VD}$) between input voltages from the third and fourth C/V translate circuits 140c, 140d, and a position in the Z direction is detected on the basis of a sum or an average value of input voltages from the first to fourth C/V translate circuits 140a to 140d. Also, a second arithmetic circuit 144 calculates movements of a finger, here, movements in a circumferential direction in accordance with the result of calculation in the first arithmetic circuit 142. More specifically, positional data, obtained in the first arithmetic circuit 142, of a finger in the X and Y directions are read, and an angle relative to a reference position (here, the positive side of the X direction) is calculated on the basis of the positional data. Then, by comparing angular data thus obtained every predetermined time interval, direction and speed of rotation are found. The result can be utilized in, for example, scroll of telephone directory loaded on portable telephones, fast-forwarding in a remote control for VTR, or the like.

Also, since the input device structured in the above manner comprises the tactile switches 118, not only the moving operation of a finger on the surface of the detecting section 104 but also a depressing operation can be made. More specifically, the input device can be used in the case where the depressing operation on the detection layer 124 makes a corresponding tactile switch 118 ON/OFF to thereby vary the moving speed of a mouse pointer on a screen. In the meantime, spring forces of the electrode terminals 112 themselves cause the pressure contact portions 112b to come into pressure contact with the respective electrodes 132a to 132e of the electrode layer 126, thus maintaining an electrically conducted state.

The provision of load sensors in place of the tactile switches 118 is preferable in that differences in magnitude of depressing forces can be reflected. That is, while the tactile switches 118 are only switched over to either of ON and OFF, a configuration capable of switching in a stepless manner on the basis of detection signals from the load sensors may be adopted.

Figure 16A:
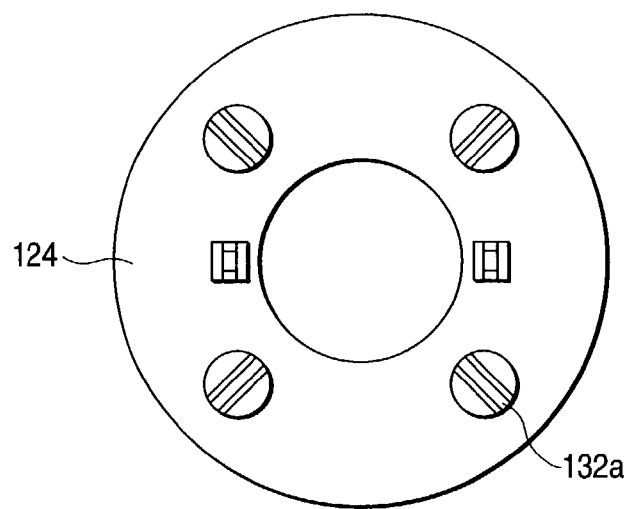
FIG. 16A is a plan view showing a configuration of connection between electrodes and terminals in a further example.
Figure 16B:
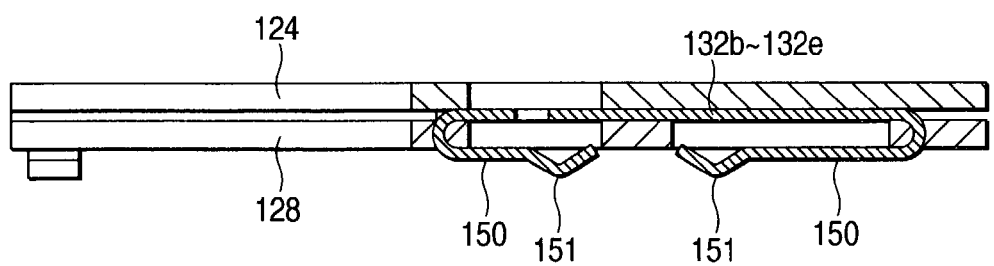
FIG. 16B is a cross sectional view of FIG. 16A.

Also, in place of the electrode terminals 112, an elastically deformable terminal portion 150 may be provided on the electrodes 132b to 132e as shown in FIG. 16. More specifically, the electrodes 132b to 132e disposed on the upper surface of the support layer 128 may be partially extended toward a lower surface side from the outer peripheral side of the support layer 128 to form the terminal portion 150, and a downwardly extending contact portion 151 may be formed on a tip end of the terminal portion 150 to be brought into pressure contact with the electrode terminal 112 of the base section 100.

FIG. 17 shows an example in the case of adopting the input device for, for example, portable telephones (see FIG. 17A).

That is, a map is displayed on a screen, and a finger is moved on the surface of the detecting section 104 to provide for utilization as the function of moving a display position of the map (see FIG. 17B). According to this, a display position of the map can be moved corresponding to an amount of movement of a finger on the surface of the detecting section 104, so that it is possible to markedly improve operability as compared with a conventional key operation.

Also, utilization as the function of adjusting a scroll speed for registration data can be made by displaying registration data, such as telephone numbers, addresses or the like, on a screen and rotatingly moving a finger on the surface of the detecting section 104 (see FIG. 17C). According to this, scroll on registration data can be made at a desired speed to enable very easily performing retrieval of intended data.

Also, utilization can be made in the case of displaying the table of the Japanese fifty kana-characters on a screen, selecting character data (see FIG. 17D), directly displaying oblique lines and characters (see FIG. 17E), performing an operation on a game screen (see FIG. 17F), or the like. In particular, in the case of directly displaying characters, utilization is possible for authentication of an individual. That is, some portable telephones need input of a personalized number as the function of authentication in order to inhibit free use by another person. Here, identification is made possible on the basis of movements (position, direction of movement, moving speed, depressing pressure, or the like) of a finger on the detecting section. In this case, however, displaying on a screen is not necessarily needed.

In addition, as in the input device according to the first embodiment, it is also possible in the input device according to the second embodiment to form the detection layer 124 from a light transmission material, to form the detecting section 104 in a dome-shape, and to adopt C/F translate circuits (electrostatic capacity/frequency translate circuits) in place of the C/V translate circuits 140.

Also, while the input device according to the second embodiment is configured to house the tactile switches 118 or load sensors, it may be configured in the same manner as the first embodiment such that the tactile switches 118 or the like are mounted on the substrate to be electrically connected to the printed substrate side by means of terminals and flexible wirings.

Figure 18:
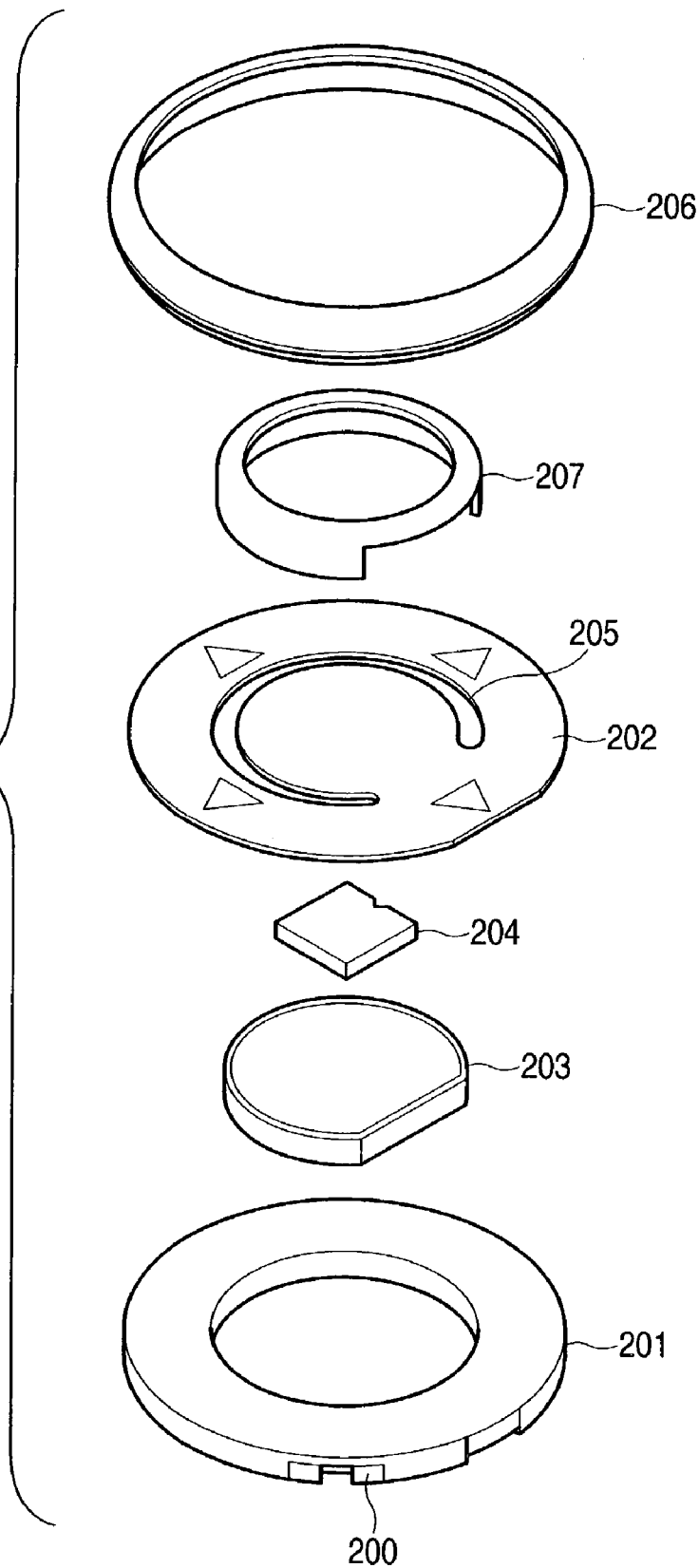
FIG. 18 is an exploded, perspective view showing an input device according to a further embodiment.

FIG. 18 shows a configuration, in which connection is made by means of a terminal. In this configuration, a multilayered substrate 202 formed with an electrode pattern is arranged on a base 201 having a terminal 200 to be electrically connected to an IC chip 204, which is arranged in a central opening of the base 201 with a frame 203 therebetween. The multilayered substrate 202 is compartmented into a central portion and an outer edge portion by an arcuate notch 205 to be guided by an outer frame 206 and an inner frame 207, which are mounted on the base 201. Thereby, the multilayered substrate 202 can be operatively depressed independently at the central portion and the outer edge portion. Like the above embodiment, the electrode pattern formed on the multilayered substrate 202 is composed of a primary electrode and secondary electrodes to be able to identify a position of a dielectric on the basis of electrostatic capacities, which are varied depending upon a position of the dielectric on a surface thereof. The base 201 is mounted on the substrate through a water-proof rubber sheet (not shown), and the terminal 200 capable of elastically deforming extends through the water-proof rubber sheet to be electrically connected to lands on the substrate. Like the above embodiment, tactile switches are mounted on the substrate in four locations on the central portion and the outer edge portion of the multilayered substrate 202 to be made ON/OFF in accordance with depressing operations in the respective positions on the multilayered substrate 202.

Figure 19:
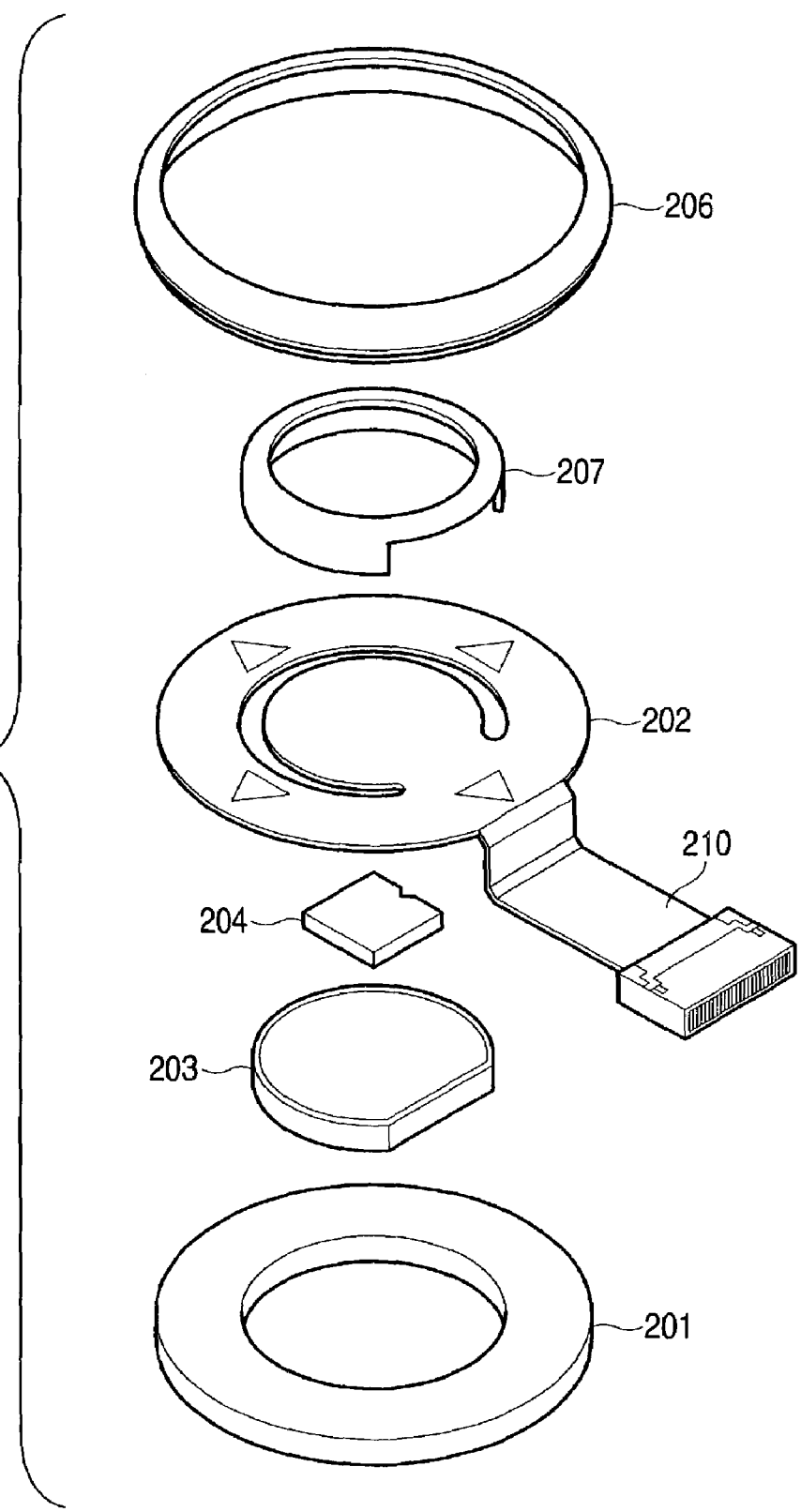
FIG. 19 is an exploded, perspective view showing an input device according to a still further embodiment.

FIG. 19 shows a configuration, in which connection is made by means of a flexible wiring. This configuration is substantially the same as that shown in FIG. 18 except that in place of a terminal provided on a multilayered substrate, electric connection to the substrate is effected by the flexible wiring 210 made integral with the multilayered substrate.

As apparent from the above description, it is possible according to the invention to manufacture a thin and small-sized input device at low cost because the device can be constituted by primary and secondary electrodes formed in the same plane. Also, since a position of a dielectric can be identified on the basis of changes in electrostatic capacity between a common primary electrode and respective secondary electrodes, highly accurate detection can be made. Further, since the number of parts is small and the configuration is simplified, it is possible to make the device less susceptible to failure and long in service life. Besides, since the secondary electrodes can be freely set in positions relative to the primary electrode and configuration, many kinds of operations become possible according to applications.

What is claimed is:

1. An input device comprising:
at least one primary electrode; and
a plurality of secondary electrodes formed in the same plane as the primary electrode; and
a first insulating layer on the primary electrode and the secondary electrode,
wherein a position of an electric conductor contacted on a surface of the insulating layer is detected based on a respective electrostatic capacity between the primary electrode and respective secondary electrodes via the electric conductor, and
wherein the respective electrostatic capacity changes based on the position of the electric conductor.

2. The input device according to claim 1, further comprising a grounding layer formed on a back surface side of the both electrodes with a second insulating layer therebetween.

3. The input device according to claim 1, wherein a sum of respective electrostatic capacity between the primary electrode and the respective secondary electrodes is calculated to detect presence and absence of the electric conductor based on changes in the sum of electrostatic capacity.

4. The input device according to claim 3, wherein the second insulating layer is formed from a material, which is varied in dielectric constant upon pressure sensing.

5. The input device according to claim 1, wherein the first and second electrodes, respectively, are formed in a dendritic shape to be arranged in an indent manner relative to each other.

6. The input device according to claim 1, wherein the first electrode is formed to be annular-shaped, and the second electrodes are formed along the first electrode.

7. The input device according to claim 1, further comprising:
   a detecting section having the primary electrode, the plurality of secondary electrodes, and the insulating layer for detecting a position of a dielectric based on respective electrostatic capacity between the primary electrode and the respective secondary electrodes via the electric conductor, and wherein the electrostatic capacity changes based on the position of the electric conductor;
   a mounting section having means for detecting a depressing operation on the detecting section; and
   a base section supporting the detecting section and the mounting section, wherein
   the base section having electrode terminals capable of elastically deforming so as to come into pressure contact with the respective electrodes of the detecting section.

8. An input device comprising:
   at least one primary electrode and a plurality of secondary electrodes, both electrodes being formed in the same plane, and wherein a position of an electric conductor disposed on a surface side of the both electrodes is identified on the basis of differences in electrostatic capacity between the primary electrode and the secondary electrodes, which electrostatic capacity is changed by the electric conductor;
   a detecting section provided with the both electrodes and for detecting a position of a dielectric disposed on a surface thereof on the basis of changes in electrostatic capacity between the both electrodes; and
   a mounting section provided with means for detecting a depressing operation on the detecting section;
   a base section supporting the detecting section and the mounting section in a manner to enable depressing the sections; and
   the base section has electrode terminals capable of elastically deforming so as to come into pressure contact with the respective electrodes of the detecting section;
   wherein the detecting section comprises arithmetic means for calculating a position of the dielectric on the basis of changes in electrostatic capacity between the electrodes; and
   an external terminal for outputting results of calculation in the arithmetic means.

* * * * *